May 9, 1967 W. C. N. HOPKINS 3,318,408
CHANGE-SPEED MECHANISM
Filed Sept. 14, 1964 4 Sheets-Sheet 1
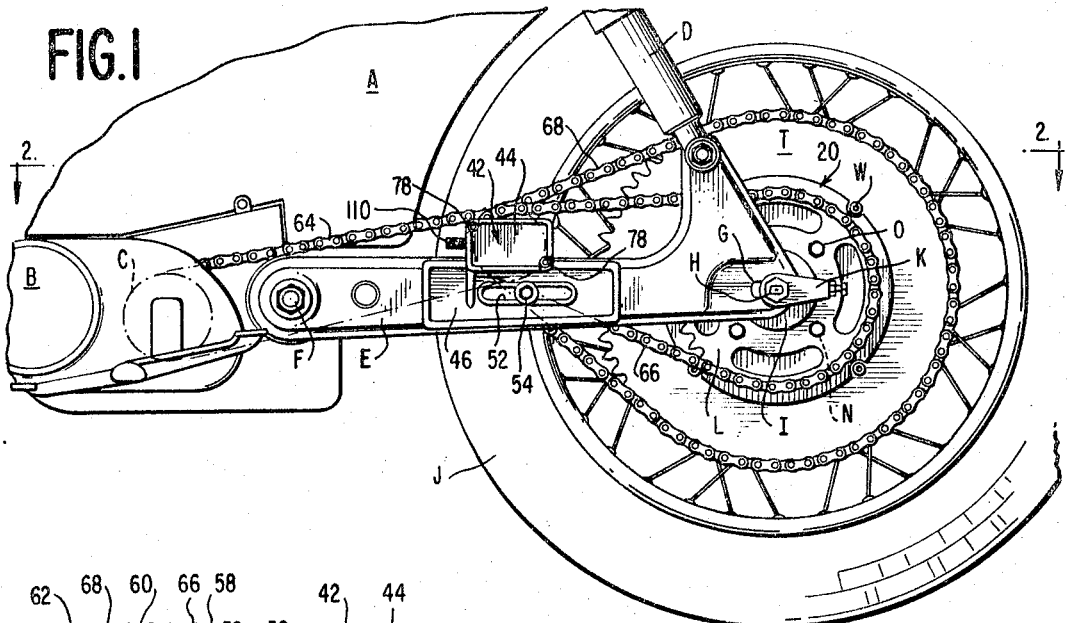
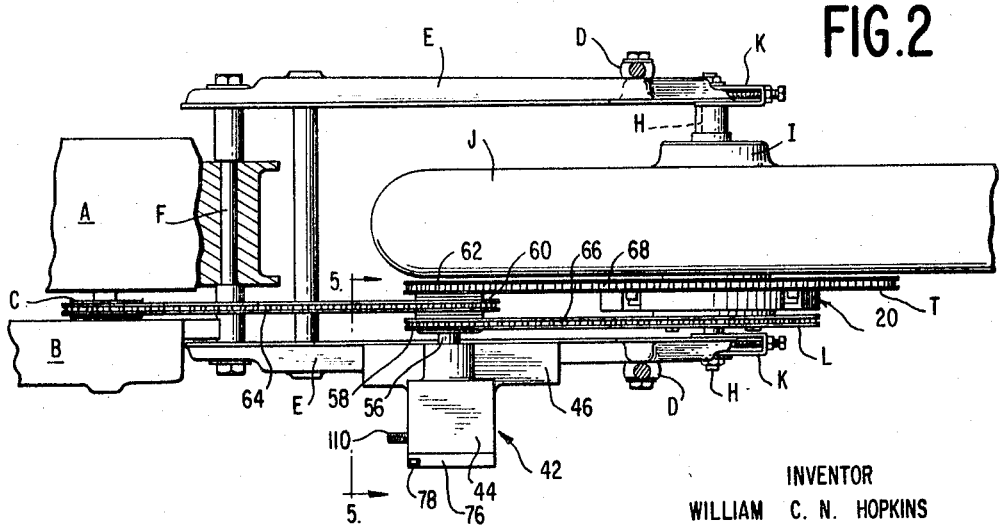
INVENTOR
WILLIAM C. N. HOPKINS
BY *Imire and Smiley*
ATTORNEYS May 9, 1967 W. C. N. HOPKINS 3,318,408
CHANGE-SPEED MECHANISM Filed Sept. 14, 1964 4 Sheets-Sheet 2

INVENTOR
WILLIAM C.N. HOPKINS

BY *Jonnie and Smiley*
ATTORNEYS

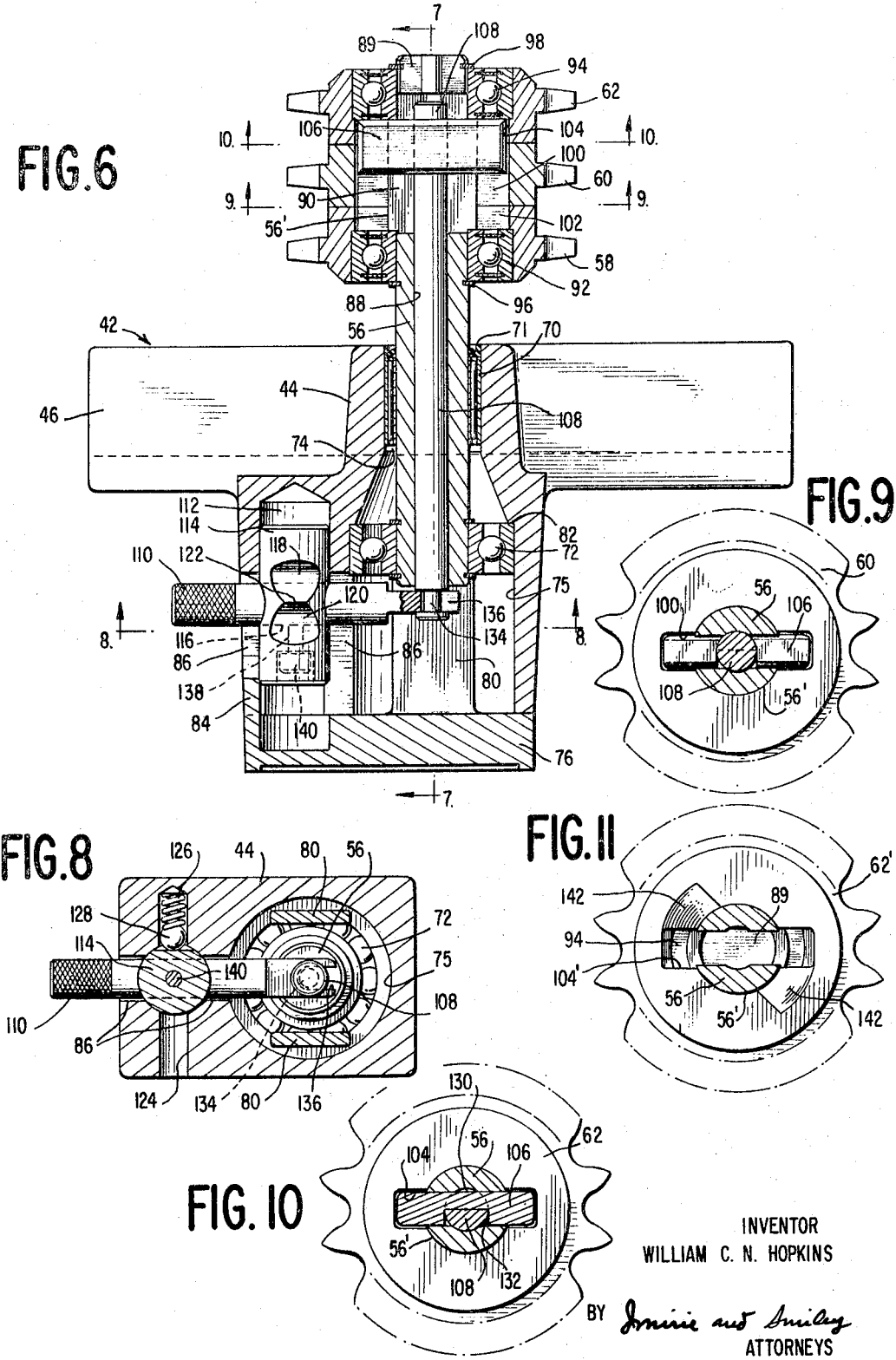

May 9, 1967 W. C. N. HOPKINS 3,318,408
CHANGE-SPEED MECHANISM
Filed Sept. 14, 1964 4 Sheets-Sheet 4
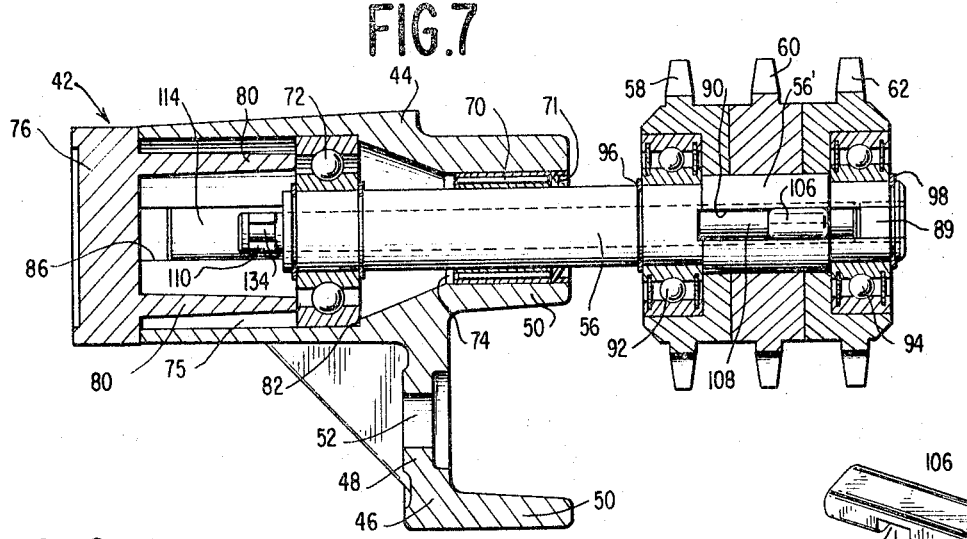
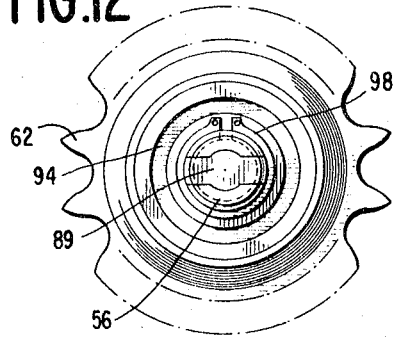
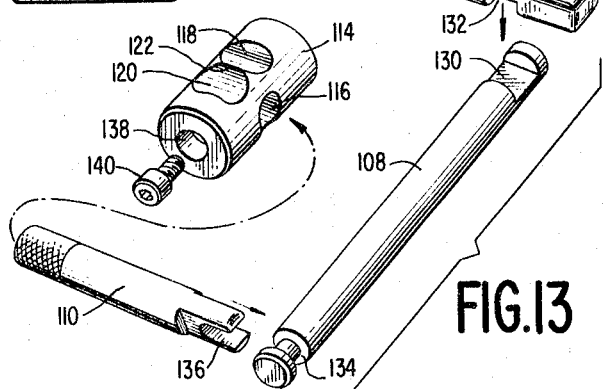
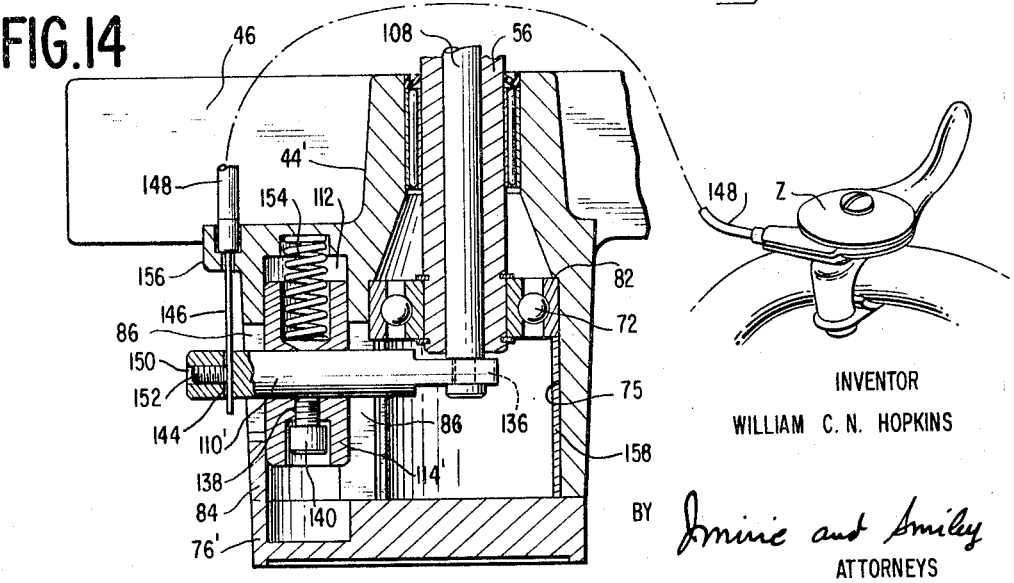
INVENTOR
WILLIAM C. N. HOPKINS
BY Irmine and Smiley
ATTORNEYS

United States Patent Office 3,318,408
Patented May 9, 1967

3,318,408
CHANGE-SPEED MECHANISM
William C. N. Hopkins, P.O. Box 551,
Walnut Creek, Calif. 94597
Filed Sept. 14, 1964, Ser. No. 396,081
20 Claims. (Cl. 180—33)

This invention relates generally to a change-speed mechanism, and more particularly to an auxiliary change-speed means for power systems including a drive sprocket and two driven sprockets of different size, especially for so-called compact motorcycles, such as the Honda.

In recent years, the use of small, compact, economical motorcycles has become extremely popular for travel on highways, golf courses, mountain trails, over rough and/or hilly terrain, and so forth. Normally the compact type of machines are of lightweight, relatively simple construction and include motor-driven manually-shiftable transmission means for driving the rear wheel of the cycle. The internal-combustion engines provided on these machines generally have a relatively low horsepower rating, and their manually operable change-speed transmissions are limited in range.

To increase the power and/or speed ranges to meet all the necessary operational and economical criteria, namely, the power requirements necessary for use of the vehicle as a "trail bike," the speed requirements necessary for use as a "highway bike," these cycles or bikes are provided with a drive wheel sprocket in the form of an overlay gear. To convert the cycle between a "trail bike" for use in hilly and/or rough terrain where power is required, and a "highway bike" where speed is desired is a dirty, time consuming job.

The overlay gear comprises a relatively small diameter sprocket fixed to the wheel hub and a large diameter ring sprocket removably mounted on, around and coplanar with the small sprocket. To convert between "trail" and "highway" conditions, it is necessary for the operator to slacken the drive chain by moving the rear wheel forward in the rear forks, remove and break the chain, remove the wheel from the rear forks, remove or mount the ring sprocket, replace the wheel between the forks, remove or add links to the chain, train it over the sprocket, and then reset the rear wheel in the forks to tighten the chain.

Having in mind the defects of the prior art apparatus, the primary object of the present invention is to provide an auxiliary change-speed mechanism that is adapted for connection with conventional compact motorcycles to permit alternate use of the cycle as a "trail bike" and as a "highway bike."

It is another object of the invention to provide an auxiliary chnage-speed mechanism for compact motorcycles that will enable conversion between "trail bike" and "highway bike" conditions without dismantling the bike or any portions thereof.

It is a further object of the invention to provide an auxiliary change-speed mechanism for all types of power systems including a drive sprocket and two driven sprockets, and having simplicity of design, economy of construction and efficiency in operation.

Briefly, in accordance with the invention, the change-speed mechanism, as applied to compact motorcycles, comprises speed selector means adapted for mounting at a convenient location on the frame of the vehicle for selectively connecting the conventional transmission drive sprocket with the larger rear wheel sprocket when high-power operation is desired, and with the smaller rear wheel sprocket when high-speed operation is desired, and, if necessary, means for fixing the pair of sprockets of the overlay gear to the rear wheel of the cycle in axially spaced relation so that they can be constantly geared to the speed selector means.

The speed selector means includes a housing adapted for mounting on the motorcycle frame, a set of three coaxial sprockets supported for rotation relative to each other by a shaft journaled at one end in the housing, the intermediate one of said sprockets being continuously geared to the transmission drive sprocket and the other two sprockets being connected respectively with the larger and smaller rear wheel sprockets, enclosed key means for alternately connecting the intermediate sprocket with either of the other two sprockets in accordance with the power or speed conditions desired at a given time, and selector means movably supported by the housing for shifting the key means as desired.

Since the motor-driven transmission means is itself manually shiftable between a number of gearing ratios, and since the change-shift means of the present invention is shiftable between high-power and high-speed conditions, it is apparent that a vehicle incorporating the present invention has twice the number of operating speeds as a conventional compact motorcycle.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a fragmentary side elevational view of the rear portion of a compact motorcycle incorporating the change-speed mechanism of the present invention;

FIG. 2 is a plan view, partially in section, of FIG. 1;

FIG. 5 is a sectional view taken on line 5—5 of FIG. 2, and showing the change-speed selector unit in elevation;

FIG. 6 is a sectional view taken on line 6—6 of FIG. 5;

FIGS. 7-10 are sectional views taken along lines 7—7, 8—8, 9—9 and 10—10, respectively, of FIG. 6;

FIG. 11 is a view similar to FIG. 10, but showing a modification;

FIG. 12 is an end view of the drive shaft and sprockets of the selector unit as viewed from the right of FIG. 7;

FIG. 13 is an exploded view in perspective of speed selector means, and

FIG. 14 is a fragmentary sectional view similar to FIG. 6, but showing a modification.

The present invention is adapted for use with all types of power systems including a drive sprocket and two driven sprockets, and is especially applicable to, and is described herein in connection with motorcycles of the so-called compact type, such as the Honda, Yamaha and Suzuki. These cycles are smaller than the standard motorcycle, and have only a limited range of speed and power. Referring now with particularity to the drawings, specifically to FIGS. 1 and 2, only the rear and lower portions of a typical bike or cycle are shown as comprising a frame A carrying a power and transmission system B including a drive sprocket C. The frame A includes rear forks D having trailing arms E mounted by a pivot bolt F to the frame A. The apices of the rear forks have slots G for slidably receiving the axle H which protrudes from the hub I of the rear wheel J. Threaded adjusting means K secured to the forks position the axle H within the slots G.

Figure 3:
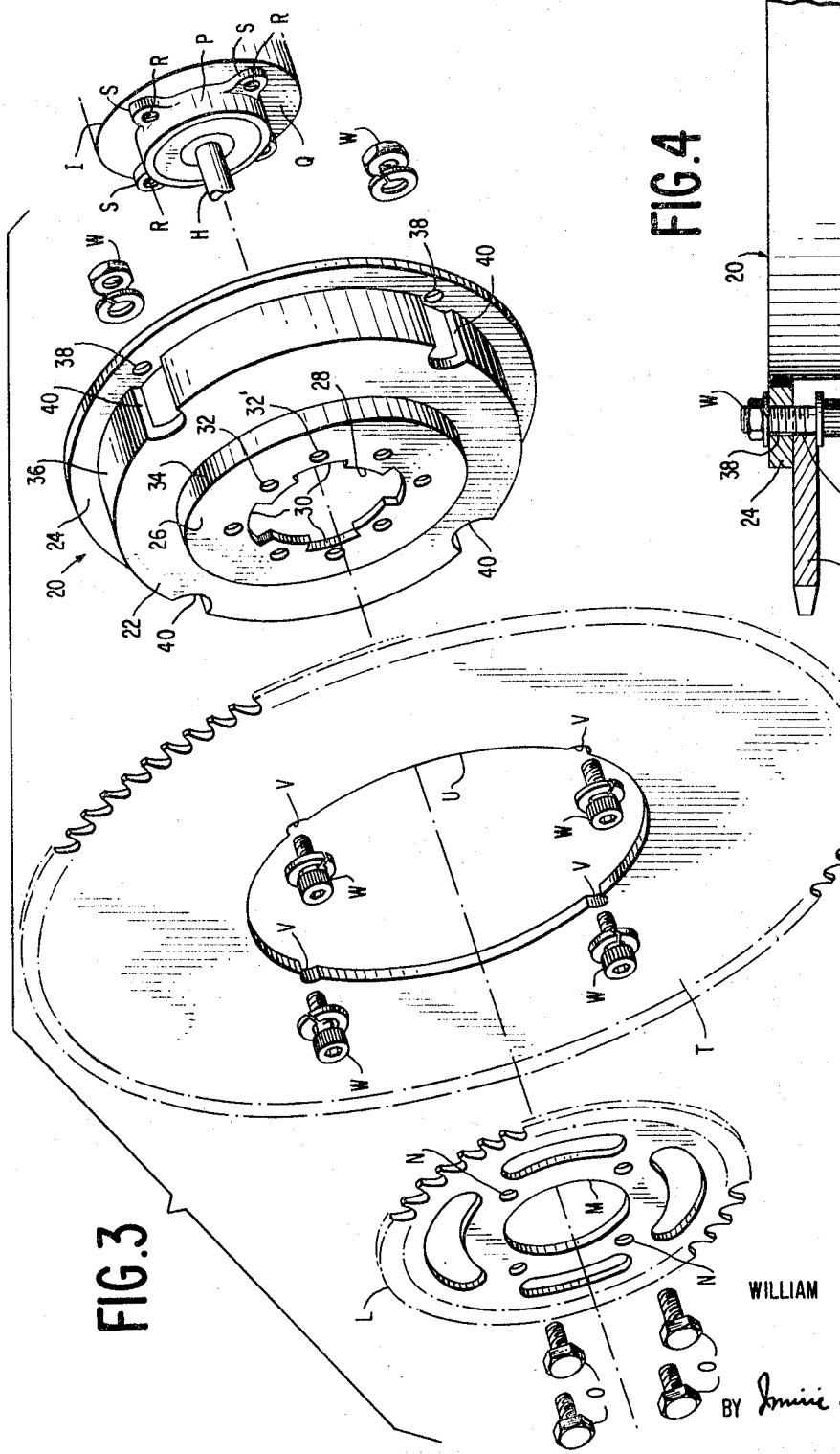
FIG. 3 is an enlarged exploded view of the overlay gear and rear wheel hub of a cycle with an adapter according to the invention.

The rear wheel J is driven from the drive sprocket C by means of a chain and an overlay gear secured to the wheel hub I. As best shown in FIG. 3, the overlay gear includes a relatively small diameter sprocket L having a central opening M and a plurality of holes N for receiving studs O. The opening M snugly fits a collar P extending from the end cap Q of the hub I and the studs O are threaded into bores R in bosses S protruding from the end cap Q. The overlay gear also includes an outer ring sprocket T having a central opening U of a size to snugly surround the outer edges of the teeth of the sprocket L. The ring sprocket T has a plurality of notches V in the periphery of the opening U, and this sprocket is secured on the sprocket L in coplanar relationship by a plurality of bolt, washer and nut assemblies W, the bolts fitting partially within the notches V and partially between certain teeth of the sprocket L and the washers overlapping both sprockets to hold them in coplanar relationship.

The compact motorcycles have only a limited speed change transmission so that the overlay gear is necessary to enable maximum speed for use as a "highway bike" on streets, paved roads and the like, or for maximum power for use as a "trail bike" for use in rough, hilly terrain and the like. In order to convert the bike from one type to another, it is necessary to remove or replace the ring sprocket T and refit the drive chain from the drive sprocket C. With the majority of the cycles of this type, this conversion requires adjustment of the means K to move the axle H forwardly in the slots G to enable removal of the chain from the wheel drive sprocket. The wheel must then be removed from the rear forks D in order to remove or replace the ring sprocket T by removing or securing the bolt assemblies W. The wheel axle H must then be reinserted in the slots G, the drive chain must be broken and links either removed or added and trained around the wheel sprocket, and the axle H must then be readjusted by the means K to apply the proper tension to the drive chain.

While one make or brand of these cycles has means on the wheel hub I to which the ring sprocket T may be secured inwardly of the sprocket L, with most such cycles it is necessary to completely remove the ring sprocket T so that when high speed is desired for a "highway bike," the ring sprocket T and bolt assemblies W must be carried separately. One of the features of the present invention resides in fixing the two sprockets L and T to the wheel hub I in axially spaced relation so that they may be constantly in driving relation with the wheel J. For the brand of cycle that has the means for securing the ring sprocket T on the hub when not in use, it is necessary only to shim out the inner sprocket L by means of washers or the like on the studs O in order to obtain the necessary axial spacing.

For other makes of cycles which do not have provision for storing the ring sprocket T, the sprockets are fixed in the necessary spaced relation, in accordance with the present invention, by means of an adapter 20 in the form of a drum 22 having a radial flange 24. This adapter 20 has a central dished portion 26 protruding axially from the drum 22 and which is interposed between the hub I and the smaller sprocket L. The dished portion 26 has a central opening 28 for fitting on the hub collar P, a plurality of notches 30 extending from the opening 28, and a plurality of holes 32, 32′ surrounding said opening. The dished portion 26 serves to space the sprocket L from the drum 22, and the periphery 34 of the portion 26 is of smaller diameter than the teeth of the sprocket L to provide chain clearance around said sprocket. The periphery 36 of the drum 22 is of a diameter to snugly fit the opening U of the ring sprocket T and the flange 24 has a plurality of holes 38 while the drum periphery 36 has a plurality of axially extending channellike notches 40 aligned with the flange holes 38.

Although the design of the various parts of these bikes or cycles is substantially the same in all of the various makes and brands, there are dimensional variations as between different makes. One of these dimensional variations is in the length of the bosses S on the hub cap Q and the spacing from the hub axis of the internally threaded bores R in the bosses. In all makes of the hubs there are four radially extending bosses S and four of the bores R, which bores are disposed on a circle concentric with the hub axis. However, as between different makes, the radius of the circle varies.

In assembling the overlay gear and the adapter 20 on the hub I, the dished portion 26 is interposed between the small sprocket L and the hub cap Q so that the central opening 28 of the adapter will snugly surround the hub collar P. For the hubs whose bosses S are relatively short and whose bores R are disposed on a circle of smaller radius, the adapter is positioned so that the notches 30 straddle the bosses S and the studs O pass directly through the sprocket holes N into the bores R with the adapter sandwiched between the sprocket L and the hub cap Q.

Figure 4:
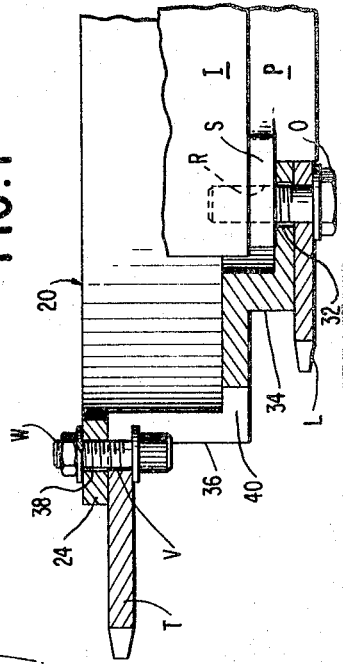
FIG. 4 is a fragmentary enlarged sectional view of the parts shown in FIG. 3, but in assembled relation.

On the other hand, if the hub has slightly longer bosses S and the bores R are disposed on a greater radius from the hub axis, then the adapter is positioned between the sprocket L and the bosses so that the studs pass from the holes N in the sprocket L, through the holes 32 in the adapter and then into the bores R, as shown in FIG. 4. If the bores R are disposed at an even greater radius from the hub axis, then the adapter holes 32′ are aligned therewith. Thus, the adapter is capable of use with all of the various makes of cycles.

Finally, as shown in FIG. 4, the ring sprocket T is mounted on the periphery 36 of the drum 22 and secured to the flange 24 by the bolt assemblies W disposed within the notches 40 and extending through the flange holes 38. In this manner, the two sprockets are rigidly connected with the hub I and are spaced laterally so that individual chains may be trained therearound.

Essentially, the present invention resides in an auxiliary speed change unit 42 adapted to be mounted on the bike for interconnection between the drive sprocket C and the spaced rear wheel sprockets L and T. More specifically, the unit 42 comprises a housing 44 having a rigid horizontal channel-shaped mounting portion 46 that fits over and is secured to one of the trailing arms E of the rear forks D. The trailing arms E in all makes and brands of the cycles are sheet metal stampings having a channel-shaped body X with outwardly extending flanges Y, as best shown in FIG. 5.

Moreover, these trailing arms taper slightly from their forward pivotally mounted ends toward their rear ends and intermediate their lengths are provided with a bolt hole to enable the attachment of auxiliary equipment of various types. Here again, however, there are dimensional variations between the various makes as to the depths and the widths of the channel body X and the exact location of the bolt hole therein.

To accommodate these variations between the different makes, the mounting portion 46 includes a bight portion 48 and leg portions 50 which are adapted to straddle the body X of the trailing arms E and which are slightly tapered longitudinally of the bight portion 48. Moreover, the leg portions 50 are slightly deeper than the deepest of the channeled bodies X so that the rear free edges of the legs 50 bear upon the flanges Y rather rather than directly upon the body X.

Thus, the mounting portion 46 can straddle any of the differently dimensioned trailing arms and be moved forward until the legs 50 grip the sides of the body X to position the housing 44 in fixed relationship relative to the bike. Finally, the bight portion 48 is provided with a longitudinally extending slot 52 to receive a bolt 54 which passes through the bolt hole in the trailing arm E to secure the unit 42 on the trailing arm. The slot 52 will overlie the bolt hole regardless of the variations in its position longitudinally of the different trailing arms E.

Extending from one end of the housing 44 is a rotary shaft 56 that carries speed, drive and power sprockets 58, 60 and 62, respectively. The intermediate drive sprocket 60 is connected with drive sprocket C by an endless chain 64 while speed sprocket 58 and wheel sprocket L are connected by an endless chain 66, and power sprocket 62 is connected with wheel sprocket T by an endless chain 68. The three sprockets 58, 60 and 62 preferably are of the same size and are identified as speed and power only because of the relative size and ratio of the wheel sprockets with which they are connected. However, these three sprockets can be varied in size and number of teeth to provide desired variations in speed and/or power.

Referring now to FIGS. 6–8, the rotary shaft 56 is journaled in spaced needle and ball bearings 70 and 72, respectively mounted in a bore 74 and chamber 75 in, and extending axially through, one end of the housing 44. The needle bearing 70 is a sealed bearing, or it may be protectively enclosed by an annular seal 71. At its other end, the housing 44 includes a removable end section or cover 76 that is secured to the housing body by bolts 78, FIGS. 1, 2 and 5. The cover 76 may include integral fingers 80 that extend axially into the chamber 75 and hold the ball bearing 72 in rigid engagement with an annular shoulder 82 at the inner end of the bore 74. The cover 76 includes also an axial projection 84 that extends, as shown in FIGS. 5 and 6, within one end of an axially extending slot 86 in the adjacent side wall of housing 44.

The rotary shaft 56 is constituted by a sleeve having an axial bore 88. Adjacent its outer end the shaft has a portion 56′ of enlarged diameter, and is provided with a diametrically disposed axial key slot 90 extending through the enlarged portion and the adjacent shaft end. Sealed ball bearings 92 and 94 are mounted on the shaft 56 on each side of the enlarged portion 56′, and retained against the shoulders formed by the enlarged portion by split lock washers 96 and 98, respectively. The speed and power sprockets 58 and 62 are mounted on the bearings 92 and 94, respectively, and partially overlying the enlarged portion 56′, and the drive sprocket 60 is mounted on said enlarged portion between said sprockets.

The three sprockets are mounted in closely juxtaposed relation and may have sealing means therebetween to exclude dust, water and the like from the interior thereof. A plug 89, shaped to conform to and completely fill the bore 88 and key slot 90 is secured in the outer end of shaft 56 by the lock washer 98. This plug prevents compression of the bifurcations of the shaft and excludes dust and the like, as best shown in FIG. 12.

The intermediate drive sprocket 60 and the adjacent ends of the sprockets 58 and 62 are provided with corresponding key slots 100, 102 and 104, respectively, for slidably receiving the ends of a key 106 mounted in the key slot 90 of the shaft 56. The key 106 is secured to the outer end portion of a rod 108 that is slidably mounted in the shaft bore 88. The key 106 has a dimension in the axial direction that is no greater, and preferably slightly less, than the thickness of the intermediate sprocket 60. Secured at the inner end of slide rod 108 is a change-speed actuator or handle 110 which extends radially thereof through housing slot 86.

The housing 44 is provided with a bore 112 whose axis is parallel with the axis of shaft 56, and which intersects the radial slot 86 longitudinally thereof. In other words, the bore 112 is parallel with the slot 86 and its axis is coplanar with the center plane of the slot 86. Moreover, the diameter of the bore 112 is greater than the distance between the facing sides of the slot. A cylinder or barrel 114 has a close sliding fit in the bore 112 and has a diametrically extending bore 116 through which the actuator handle 110 extends. The barrel 114 has a greater length than the opening of the slot 86 as determined by the cover extension 84 and serves not only to support the actuator handle 110 in rigid radial relation relative to the slide rod 108, but also to seal the slot 86 against the ingress of dust, water and the like.

The barrel 114 is provided on the upper side thereof with two dished portion 118 and 120 which are closely adjacent and jointly define an outwardly directed edge 122. The housing 44 is also provided with a smaller bore 124, FIG. 8, diametrically of the bore 112 and within the inner end of which is disposed a spring 126 and ball 128 to constitute a ball detent cooperative with the recessed portions 118, 120 to retain the speed selector mechanism in either of the extreme positions in order to key the drive sprocket 60 with either the speed sprocket 58 or the power sprocket 62. The edge 122 tends to cause the detent to urge the barrel 114 toward one of its extreme positions.

The speed selector mechanism itself has certain novel structure that facilitates manufacture and assembly and reduces cost. As best shown in FIG. 13, the slide rod 108 is provided with a notch 130 adjacent its outer end for receiving the key 106, and the key likewise is provided with a notch 132 for straddling the slide rod. Thus, the key and slide rod have a dovetail-like connection which retains them in rigid relative relationship when mounted within the bore 88 and key slot 90 in the shaft 56. Assembly is facilitated in that the key may be fitted on the rod and the rod and key inserted through the outer end of the shaft 56 into the bore 88 and key slot 90, respectively, after which the plug 89 may be inserted.

At its other end, the slide rod 108 is provided with an annular groove 134 which is straddled by a yoke 136 on the inner end of the actuator handle 110. Thus, to assemble the actuator handle, it is merely passed through the bore 116 in the barrel 114 and the barrel slid within the bore 112 until the yoke 136 is aligned with the annular groove 134, whereupon the handle 110 can be moved inwardly until the yoke straddles the grooved portion. In its outer end, the barrel 114 is provided with an internally threaded bore 138 that intersects the handle bore 116 and within which fits a set screw 140 for securely clamping the handle 110 when the latter is in assembled position.

To facilitate movement of the key 106 into the key slots 102 and 104 of the sprockets 58 and 62, respectively, the longitudinal edges of the key are beveled or rounded so as to provide a lead into the slots as soon as the key and slots are aligned. As shown in FIG. 9, the drive sprocket 60 is provided with a single key slot 100 because the key partially fits within the slot at all times. It has been found that a single key slot is sufficient for the driven gears as shown in FIG. 10, but if desired a second key slot disposed at right angles may be provided to expedite mating of the key with the driven gear slot.

An alternative modified arrangement for the driven sprockets is shown in FIG. 11 as including cam recesses 142 in the face of the sprocket 62′ and extending to the leading edges of the key slot 104′ so that the key may be led into the key slot as the sprocket is rotated. FIG. 11 is a view similar to FIG. 10, but shows the sprocket 62′ in the condition when the key and slide rod have been withdrawn to the opposite end of their stroke. According to this modification, the inner face of the other driven sprocket will be identical to that shown in FIG. 11 except that the cam recesses 142 will be on the relative opposite sides of the key slot.

The structure so far described is more particularly adapted for manual operation directly of the actuator handle 110, the outer end of which may be knurled to facilitate grasping thereof. This structure may be readily modified and adapted for remote control operation as shown in FIG. 14. In this instance, the actuator handle 110′ is provided with a small diametrically disposed bore 144 adjacent its outer end for receiving the cable or wire 146 of a flexible cable 148. The actuator handle 110′ is provided in its outer end with an axially disposed internally threaded bore 150 for receiving a set screw 152 for securing the cable 146.

Preferably, the housing 44' is provided with an apertured ear 156 through which the cable 146 extends and within which the end of the sheath of the cable 148 is press fitted. Cables of this type are capable of pulling operations, but they are not dependable for pushing operations if there is any degree of resistance. Accordingly, the barrel 114' preferably is urged toward its outer position by a spring 154 interposed between the inner end of the bore 112 and the barrel. In this instance, the ball detent arrangement of the barrel may be eliminated and the spring 154 preferably is of suffiicent strength to urge the barrel toward its one extreme of movement.

The flexible cable 148 may be connected to a standard manual control element Z adapted to be mounted on the handle bars of the bike. The element Z is a standard unit which is manufactured and sold primarily for use as a choke control and as a general rule the handle thereof has sufficient friction with the supporting body to retain it in selected position and hold the barrel 114' against the pressure of the spring 154 when it is desired that the speed selector mechanism be retained in its other extreme position.

A further modification is shown in FIG. 14 with respect to the retaining means for the ball bearing 72. In this arrangement, the fingers 80 are omitted from the cover plate 76', and the retainer is constituted by a longitudinally split sleeve 158 which is disposed in the chamber 75 with the split therein registered with the slot 86. The sleeve is of a length to fit snugly between the inner surface of the cover 76' and the bearing 72 and holds the latter against the shoulder 82. The sleeve 158 may be slightly resilient so that it will frictionally engage the walls of chamber 75 to preclude rotational movement that might bind against the actuator handle 110, 110'.

It is apparent that when the speed change selector elements are in the positions illustrated in FIGS. 6 and 7, power sprocket 62 is keyed to intermediate drive sprocket 60 by key 106, actuator member 110 being retained in position by the engagement between the spring-biased detent ball 128 and the inclined or dished surface 118 on piston barrel 114. With the remote control arrangement of FIG. 14, the actuator member 110' will be retained by the remote control unit Z through the cable wire 146. Consequently, when intermediate sprocket 60 is driven by endless chain 64 and main drive sprocket C, shaft 56 and power sprocket 62 are also driven and in turn drive chain 68 and wheel sprocket T. At this time, speed sprocket 58 is in an idle condition.

When it is desired to shift from "trail bike" power conditions to "highway bike" speed conditions, the actuator member 110 is displaced, downwardly in FIG. 6, to the opposite end of its stroke, and movement of the barrel piston 114 causes the detent ball 128 to pass over the edge 122 and to engage the other retaining surface 120. Alternatively, operation of the remote controller Z enables the spring 154 to shift the barrel piston 144'. This movement causes slide rod 108 and key 106 to be axially displaced from the key slot 104, sprocket 62, into the key slot 102, sprocket 58 so the latter is connected to drive chain 66 and wheel sprocket L, and power sprocket 62 is in an idling condition.

It is apparent that for each of the gear conditions selected by the conventional transmission means B, at least two and up to four additional drive conditions for the rear wheel J may be obtained by the use of the change-speed means 42 of the present invention. Merely by adjusting the position of actuator member 110, 110', high-speed or high-power conditions may be selected as desired.

The change-speed unit 42 has been particularly designed for inexpensive manufacture and reliable operation. In addition to the unique structure and assembly of the selector mechanism previously described, the housing body 44 and the removable section 76 preferabally are formed by a casting process. The design and construction of the apparatus is such that the machining of the cast bodies is reduced to a minimum. Moreover, the working parts are completely enclosed and sealed against dust, water and other foreign matter that might impair operation and reduce the life thereof.

Although certain specific embodiments of the invention have been shown and described, it is obvious that many modifications thereof are possible. Furthermore, although the invention is shown and described herein in association with a compact motorcycle, it is equally applicable to other types of power systems for use in industrial, marine, aircraft and other types of vehicular equipment. The invention, therefore, is not to be restricted except insofar as is necessitated by the prior art and by the spirit of the appended claims.

That which is claimed is:

1. Auxiliary change-speed mechanism for motorcycles having a drive sprocket and a wheel driving overlay gear including a relatively small diameter sprocket and a relatively large diameter ring sprocket, said mechanism including an adapter for said overlay gear sprockets and a change-speed unit, said adapter comprising a drum having a drum face for interposition between the overlay gear small sprocket and the wheel hub and including a cylindrical periphery adapted to have the ring sprocket mounted thereon in axially spaced relation from the small sprocket, and said unit comprising a housing including a mounting bracket for attachment to a motorcycle, a shaft journaled in said housing and with one end portion extending therefrom, three sprockets mounted on said shaft end portion with one of said sprockets connectible with a motorcycle drive sprocket and other two of said sprockets connectible with the two wheel sprockets, respectively, said one sprocket being fixed on said shaft in driving relation therewith, said other two sprockets being journaled on said shaft for relative rotation therebetween, and speed selector means within said housing for selectively fixing only one of said other two sprockets with said shaft for driving relation therebetween.

2. Auxiliary change-speed mechanism for motorcycles having a drive sprocket and a wheel driving overlay gear including a relatively small diameter sprocket and a relatively large diameter ring sprocket, said mechanism including an adapter for said overlay gear sprockets and a change-speed unit, said adapter comprising a drum for interposition between the overlay gear small sprocket and the wheel hub and adapted to have the ring sprocket mounted thereon in axially spaced relation from the small sprocket, and said unit comprising a housing including a mounting bracket for attachment to a motorcycle, a shaft journaled in said housing and with one end portion extending therefrom, three sprockets mounted on said shaft end portion with one of said sprockets connectible with a motorcycle drive sprocket and the other two of said sprockets connectible with the two wheel sprockets, respectively, said one sprocket being fixed on said shaft in driving relation therewith, said other two sprockets being journalled on said shaft for relative rotation therebetween, speed selector means within said housing for selectively fixing only one of said other two sprockets with said shaft for driving relation therebetween, said adapter drum including a cylindrical periphery, a drum face on one side of said periphery and a radial flange on the other side of said periphery, said flange having holes spaced therearound, said periphery being of a size to snugly fit within the ring sprocket and having spaced channellike notches aligned with said flange holes for accommodating bolts for securing the ring sprocket to said flange, and an axially disposed dished portion extending from said drum face and having a central opening for fitting on a wheel hub collar, said dished portion having openings spaced around said central opening for accommodating bolts for securing the smaller diameter sprocket to the wheel hub with said dished portion sandwiched therebetween, the periphery of said dished portion having a diameter less than that of the teeth on the smaller sprocket to provide chain clearance therearound.

3. A change-speed mechanism according to claim 2 wherein said bolt accommodating openings in said dished portion include a plurality of sets of openings respectively disposed on circles concentric with and having different radii from the axis of said central opening.

4. A change-speed mechanism according to claim 3 wherein the set of openings closest to the axis is constituted by notches opening into said central opening.

5. A change-speed unit for power systems including a drive sprocket and two driven sprockets of different diameters, said unit comprising a housing, a shaft journalled in said housing and with one end portion extending therefrom, three sprockets mounted on said shaft end portion with the middle sprocket connectible with a power drive sprocket and the outer two of said sprockets connectible with two driven sprockets, respectively, said middle sprocket being fixed on said shaft in driving relation therewith, said outer two sprockets being journalled on said shaft for relative rotation therebetween, and speed selector means within said housing for selectively fixing only one of said outer two sprockets with said shaft for driving relation therebetween, said speed selector means including a key slidable axially on said shaft and engageable in keyways in said three sprockets, the range of movement of said key being such that it can span said middle sprocket and only one of said outer sprockets.

6. A unit according to claim 5 wherein said drive sprocket has a key slot extending therethrough and is fixed to said shaft by said key continuously received in said sprocket key slot, the thickness of said middle sprocket being at least equal to the dimension in the axial direction of said key, said other two sprockets having corresponding key slots in their sides adjacent said drive sprocket, and said selector means being connected with said key and operable to move said key into the key slot of one of said other sprockets to key it with said shaft and drive sprocket.

7. A change-speed unit for power systems including a drive sprocket and two driven sprockets of different diameters, said unit comprising a housing, a shaft journaled in said housing and with one end portion extending therefrom, three sprockets mounted on said shaft end portion with one of said sprockets connectible with a power drive sprocket and the other two of said sprockets connectible with two driven sprockets, respectively, said one sprocket being fixed on said shaft in driving relation therewith, said other two sprockets being journaled on said shaft for relative rotation therebetween, speed selector means within said housing for selectively fixing only one of said other two sprockets with said shaft for driving relation therebetween, a mounting bracket on said houssing for attachment to a motorcycle, said bracket comprising a channel-shaped member including a bight portion and two leg portions adapted to straddle a trailing arm of the rear forks of a motorcycle, said leg portions having a depth greater than the thickness of the trailing arm so that the free edge portions of said leg portions can abut flanges along the top and bottom of the trailing arm, said bight portion having an opening therein for passage of an attaching bolt extending through a bolt opening in the trailing arm.

8. A unit according to claim 7 wherein said leg portions taper from their forward toward their rear ends to correspond with the taper of a trailing arm, and the opening in said bight portion constitutes a slot to register with the arm bolt opening regardless of variation in location of said bracket along the trailing arm.

9. A change-speed unit for power systems including a drive sprocket and two driven sprockets of different diameters, said unit comprising a housing, a sleeve shaft journaled in said housing and with one end portion extending therefrom, said shaft end portion having a diametrically disposed key slot, three sprockets mounted on said shaft end portion with the intermediate sprocket connectible with a power drive sprocket and the other two of said sprockets connectible with two driven sprockets, respectively, said sprockets overlying said shaft key slot and having key slots for registry therewith, a key in said shaft key slot and continuously received in said intermediate sprocket key slot, said key slot extending completely through said intermediate sprocket and the thickness of said sprocket being at least equal to the axial dimension of said key, said other two sprockets being journaled on said shaft for relative rotation therebetween, a rod extending through said sleeve shaft and connected at its outer end with said key for shifting the latter to partially engage in the key slot of one of said other two sprockets, said housing having an opening in one wall thereof, and an actuator portion extending from the inner end of said rod through said wall opening for shifting said rod.

10. A unit as defined in claim 9 wherein said housing wall is parallel with said shaft and the opening therein being an axial slot, and said actuator portion includes a selector member extending radially from said slide rod and extending through said housing axial slot.

11. A unit as defined in claim 10 comprising means for guiding said selector member for parallel lateral displacement in a plane containing said slide rod.

12. A unit as defined in claim 11 wherein said guide means comprises piston and cylinder means within said housing and longitudinally intersecting said axial slot.

13. A unit as defined in claim 12 comprising means for retaining said selector member in the positions in which said key connects said intermediate sprocket with said other sprockets, respectively.

14. A unit as defined in claim 13 wherein a side-wall surface of said piston contains a pair of recesses defining axially arranged relatively inclined surfaces, and said retaining means comprises spring-biased detent means in said housing for alternate engagement with said inclined surfaces.

15. A unit as defined in claim 13 wherein said retaining means includes a spring in said cylinder and biasing said piston toward one position, and remote control cable means connected with said selector member for moving said piston against said spring to its other position.

16. A unit as defined in claim 12 wherein said slide rod has a notch adjacent its outer end and an annular groove adjacent its inner end, said key having a notch across its middle portion and being retained in dovetail relation with said rod by said shaft key slot, said selector member having a yoke at its inner end and straddling said annular groove, said piston having a diametrically disposed bore through which said selector member extends, said piston also having a threaded axial bore and set screw therein for retaining said selector member.

17. A unit as defined in claim 9 wherein said shaft key slot extends through the adjacent end of said shaft, said sprockets are retained on said shaft by a split lock ring on the end of said shaft, and a plug wedged between the bifurcated shaft portions at the free end of said shaft and retained by said lock ring.

18. A unit as defined in claim 9 wherein said housing includes a body portion having a chamber opening through the end opposite the end through which said shaft extends, an antifriction bearing in said chamber and supporting the inner end of said shaft, a cover member closing said open end of said body portion, and means extending from the inner side of said cover and abutting said bearing to retain the latter against the inner end of the chamber.

19. A unit as defined in claim 9 wherein the faces of said other two sprockets adjacent said intermediate sprocket contain cam guide surfaces for facilitating axial entry of said key into the key slots in said two sprockets.

20. In combination, a motorcycle having a frame, motor-driven transmission means supported on said frame and including a drive sprocket, an axle-mounted rear wheel including a hub connected with said frame, a first pair of sprockets of unequal diameter, means connecting said pair of sprockets and spaced relation coaxially with said rear wheel, said means including a drum having a drum face and a cylindrical periphery, said drum face being interposed between said wheel hub and the smaller of said first pair of sprockets, the larger of said first pair of sprockets being a ring sprocket mounted on said drum periphery, a housing rigidly connected with said frame, a shaft rotatably journaled in said housing and extending therefrom, three additional sprockets mounted on said shaft externally of said housing, a first endless chain connecting the intermediate one of said three additional sprockets with said transmission drive sprocket, second and third endless chains connecting the other two of said additional sprockets with said first pair of sprockets, respectively, key means movably mounted on said shaft in engagement with said intermediate sprocket for connecting said intermediate sprocket alternately with said other two additional sprockets, respectively, and means enclosed within said housing for selectively shifting said key means.

References Cited by the Examiner

UNITED STATES PATENTS

| | | | |
|---|---|---|---|
| 517,063 | 3/1894 | Pringle | 74—217 |
| 625,111 | 5/1899 | Lane et al. | 74—217 |
| 2,193,289 | 3/1940 | MacBlane | 74—217 |

FOREIGN PATENTS

| | | |
|---|---|---|
| 500,950 | 1/1920 | France. |
| 216,759 | 6/1924 | Great Britain. |

DAVID J. WILLIAMOWSKY, *Primary Examiner.*

J. A. WONG, *Assistant Examiner.*